(12) United States Patent
Laurin

(10) Patent No.: US 9,632,733 B2
(45) Date of Patent: Apr. 25, 2017

(54) PERSONAL PRINT SERVER

(71) Applicant: XEROX CORPORATION, Norwalk, CT (US)

(72) Inventor: Eric Laurin, Beaverton, OR (US)

(73) Assignee: XEROX CORPORATION, Norwalk, CT (US)

( * ) Notice: Subject to any disclaimer, the term of this patent is extended or adjusted under 35 U.S.C. 154(b) by 0 days.

(21) Appl. No.: 14/567,492

(22) Filed: Dec. 11, 2014

(65) Prior Publication Data

US 2016/0170694 A1 Jun. 16, 2016

(51) Int. Cl.
*G06F 3/12* (2006.01)
*H04W 4/00* (2009.01)

(52) U.S. Cl.
CPC .......... *G06F 3/1236* (2013.01); *G06F 3/1204* (2013.01); *G06F 3/126* (2013.01); *G06F 3/1292* (2013.01); *H04W 4/008* (2013.01)

(58) Field of Classification Search
USPC ....................................................... 358/1.15
See application file for complete search history.

(56) References Cited

U.S. PATENT DOCUMENTS

| | | | |
|---|---|---|---|
| 6,975,419 B2 | 12/2005 | Staas et al. | |
| 8,248,637 B2 | 8/2012 | Dolan et al. | |
| 8,482,776 B2 * | 7/2013 | DeRoller | G06F 3/1207 358/1.13 |
| 8,547,583 B2 | 10/2013 | Dolan et al. | |
| 8,854,669 B1 * | 10/2014 | Jazayeri | G06F 3/1204 358/1.15 |
| 2003/0069921 A1 * | 4/2003 | Lamming | G06F 17/30905 709/203 |
| 2013/0191518 A1 * | 7/2013 | Narayanan | H04W 8/18 709/220 |

* cited by examiner

*Primary Examiner* — Ngon Nguyen
(74) *Attorney, Agent, or Firm* — Marger Johnson

(57) ABSTRACT

A mobile device has a user interface, a processor, a storage, a network communication interface, a local communication interface, instructions stored in the storage that, when executed by the processor, allow the device to receive and store digital content through one of the communication interfaces, identify the digital content for queueing for printing, based upon an input received through the user interface, queueing the digital content for printing with associated printing parameters, and broadcasting a request for a printer.

11 Claims, 3 Drawing Sheets

PERSONAL PRINT SERVER

TECHNICAL FIELD

This disclosure relates to mobile devices, more particularly to providing mobile devices the ability to identify and print content.

BACKGROUND

Users of mobile devices such as tablets and cell phones frequently acquire digital content. Digital content may include pictures, documents, coupons, maps, tickets, boarding passes, etc. Typically, the user may want to make a physical copy of the content. Usually, though, the user does not have access to some sort of physical marking device, like a printer, at the time the user acquires the content.

If the user does not have access to a printer, the user will typically either not print the content or may store it on in the cloud. However, using the cloud adds extra steps and requires the user to get to a device that is connected to a printer, access the information on the cloud and then print it out.

SUMMARY

Embodiments include a mobile device that has a user interface, a processor, a storage, a network communication interface, a local communication interface, instructions stored in the storage that, when executed by the processor, allow the device to receive and store digital content through one of the communication interfaces, identify the digital content for queueing for printing, based upon an input received through the user interface, queueing the digital content for printing with associated printing parameters, and broadcasting a request for a printer.

Other embodiments include a method including receiving digital content on a mobile device, putting the digital content into a print queue based upon a user input, advertising the print queue from the mobile device, receiving a signal from an available printing device when the mobile device comes into range of the printing device, and transmitting the digital content to the printing device.

DETAILED DESCRIPTION OF THE EMBODIMENTS

Figure 1:
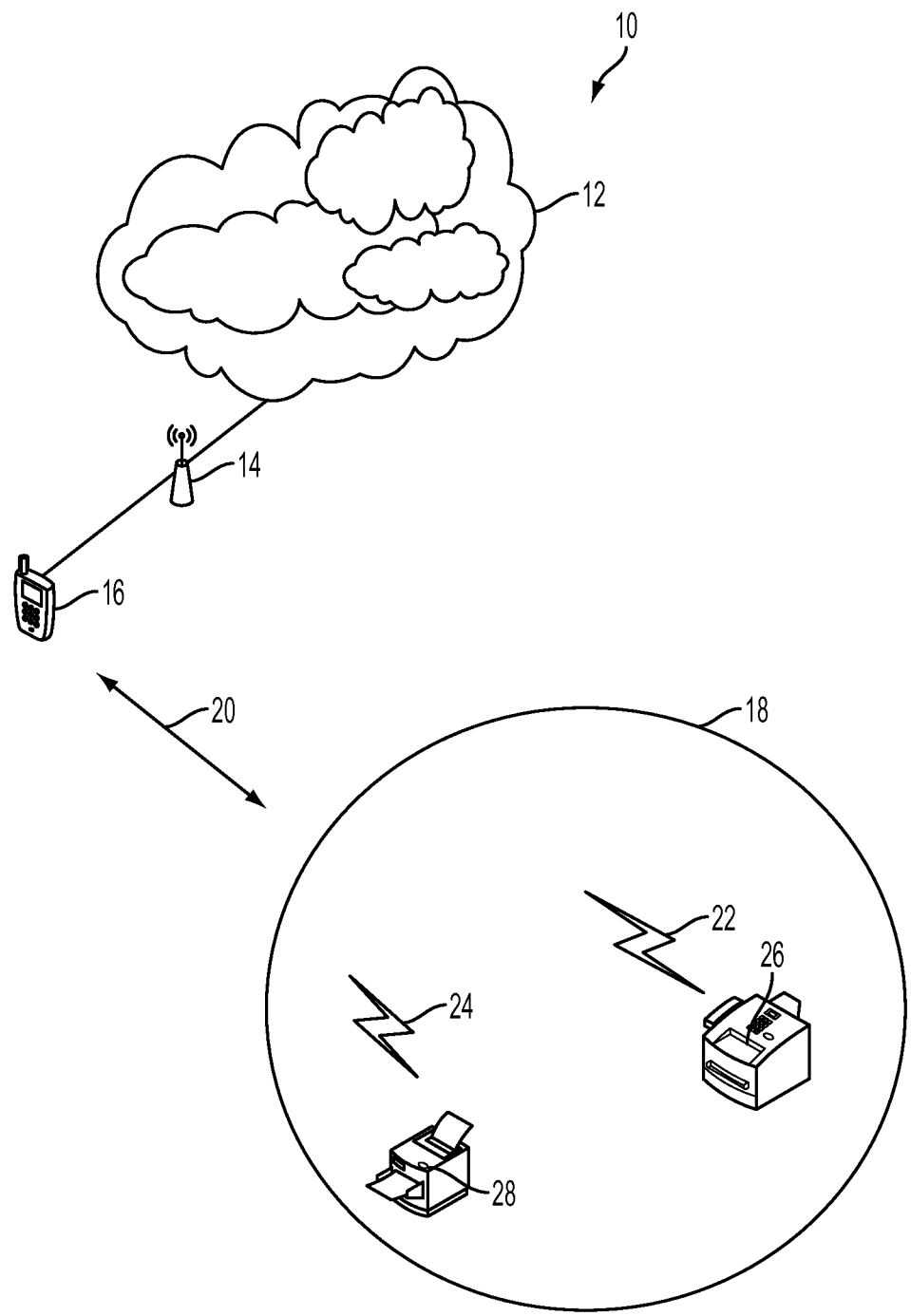
FIG. 1 shows an embodiment of a system including a mobile device having a print queue.

This discussion will use the term 'print server,' which is sometimes also referred to as a 'printer server.' As used here, a print server is a device or application that connects client computers, including smart phones and tablets, to printers over a communication link. The print server accepts print jobs from an application running on the computing device and sends the jobs to the appropriate printer. Unlike most print servers, however, this print server here will queue jobs to be printed when an appropriate printer is within range of the device. Typically, print servers queue jobs only until the printer is ready to print them.

The term 'local communication interface' as used here means a communications interface that allows two or more devices within range of each other to communicate directly, rather than through a separate network device. Examples include Bluetooth®, infrared, or other short distance communication protocol. While devices may set up what may be referred to as a personal area network, the term 'network communication interface' applies to any communications protocol that requires a third device to establish communication between devices, such as a wireless access point, gateway or router. A network interface may be wired, such as an Ethernet connection, or wireless such as a wireless fidelity, or Wi-Fi, interface, a cellular data interface, etc. One should note that while the discussion here will focus on Bluetooth® as the local communication interface, no limitation to that particular interface is intended nor should be implied. Any local communication interface, in existence in becoming available in the future, is considered within the scope of the embodiments here.

The print server discussed here may be implemented as an application or 'app' on a smart phone or tablet, which are familiar to most users of cell phones and tablets that purchase apps from the iTunes® store or Google® Play store. No limitation to any particular implementation of the print server is intended, the term application as used here is any set of instructions executable by a processor.

Embodiments enable a mobile printing workflow that provides consumers with a cloud like workflow without having to utilize a remote cloud for the storage of their personal content. The embodiments here does not try to push content to be printed from a mobile device to printing cloud storage this makes use of the users' personal mobile device to be easily integrated into existing printing workflows in which they are already accustomed to and couples it with technologies that exist to easily pair and connect devices together.

The mobile print server will allow users to be able to either automatically add printers to their printer server by going into settings and searching for beaconing printers which are within close proximity Once discovered a user can select the printer to add, this has an added benefit of allowing the print server application to directly query the device for supported capabilities and automatically store those capabilities to be reflect to the user when adding jobs to be printed at a later time.

The embodiments here allow the user to establish multiple mobile print servers that may differentiate the type of printing they do and when and where the user would like to have the content automatically printed. For example, a user could establish mobile print servers for 'retail photo,' 'work,' 'remote office,' 'frequent travel destination,' 'home,' etc.

FIG. 1 shows an embodiment of a system 10 in which a user can employ a print server. A user has a mobile device, in this example a smart phone 16. The user receives some form of digital content, either by capturing it using the phone, or from another user. The user may be connected to the cloud 12 through a wireless access point 14, but there are no printers available. If the user moves in the direction of the arrow 20.

When the user gets into range 18 of an advertising printing device. The printing device is advertising or beaconing, making repeated announcements of its availability. Examples of such services that are used for beaconing include mDNS (multicast Domain Name Service), WSD (web services for devices), or iBeacon. iBeacon is the name for Apple's indoor positioning system that allows devices to communicate when they get into range of the beacon.

In this example, the printing devices 26 and 28 are both advertising. In some instances, as will be discussed later, the print queue on the print server application may have several print jobs waiting. The print server may have a first job to be sent to a retail photo printer, in this example, printing device 28. The print server may have a second job that is a large job and needs a high speed printer, in this case printing device 26. The print server then sends each job to the appropriate printer.

Figure 2:
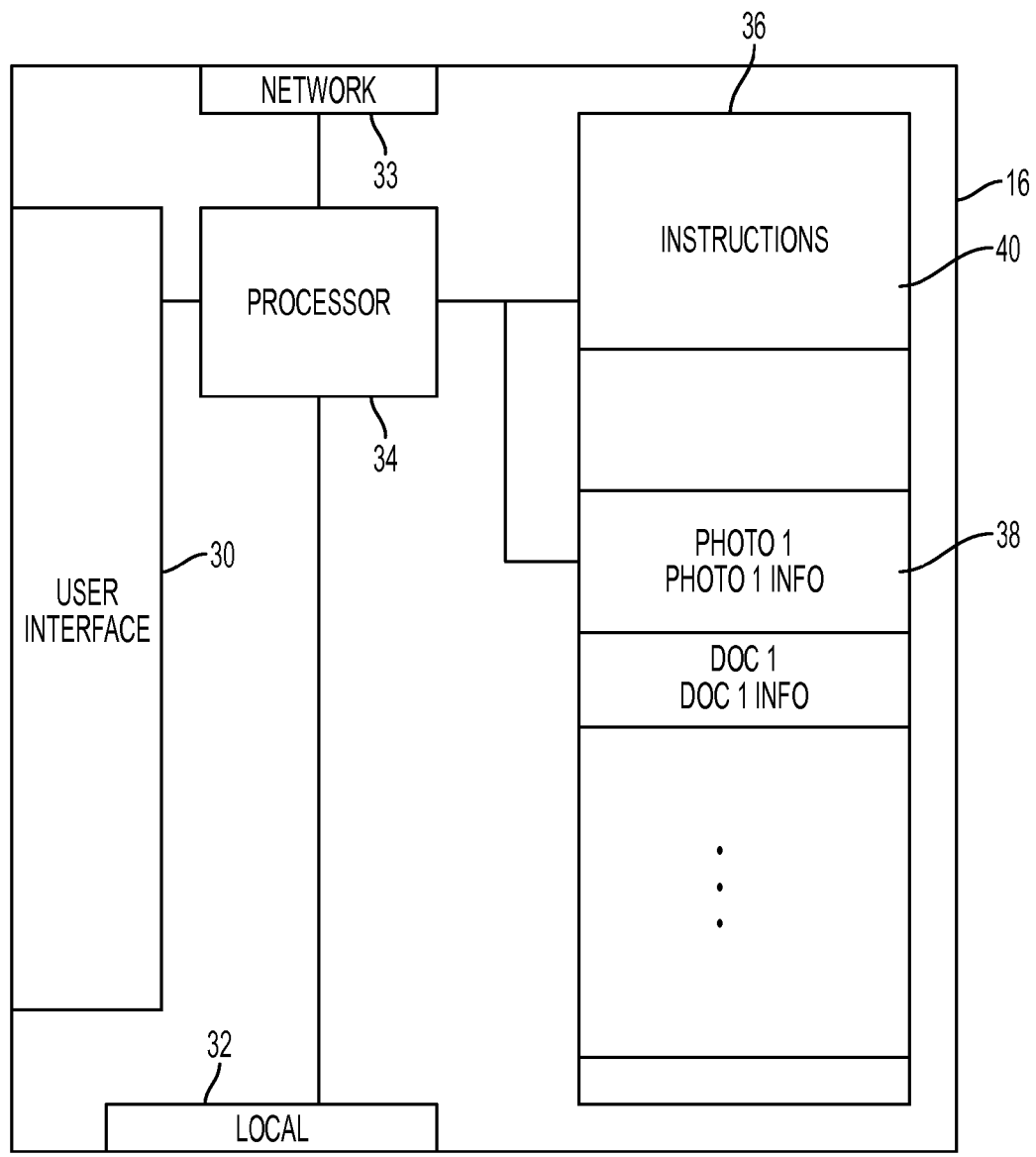
FIG. 2 shows an embodiment of a mobile device having a print queue.

The print server application will typically reside on a mobile device. FIG. 2 shows an embodiment of a mobile device 16. The mobile device has a user interface 30, such as a touch screen upon which the print server is displayed and through which the user provides inputs to identify print jobs that need to be queued. The user input is received by the processor 34. The application may take the form of instructions 36 in the storage 40. The instructions are executed by the processor to cause the device to run the print server application. The storage 40, or a separate storage, stores the digital content information that needs to be printed. The print queue 38 stores the digital content and associated information. The print queue may not actually store the digital content, it may just store a pointer to the digital content. The associated information may include the requirements needed for the particular job, including the resolution of the printer, the printing speed, costs of printing, color spectrum, location of the printer, etc.

The mobile device may also include one or more communication interfaces. One interface is a local interface 32 and the other is a network interface 33. While these interfaces are shown to be separate, they may actually employ the same physical medium to communicate. For example, Wi-Fi communications and Bluetooth® communications both use radio frequencies to communicate. Therefore, they may actually employ the same radio transmitter in the device. The interfaces control the nature of the transmissions in accordance with their appropriate protocols.

Figure 3:
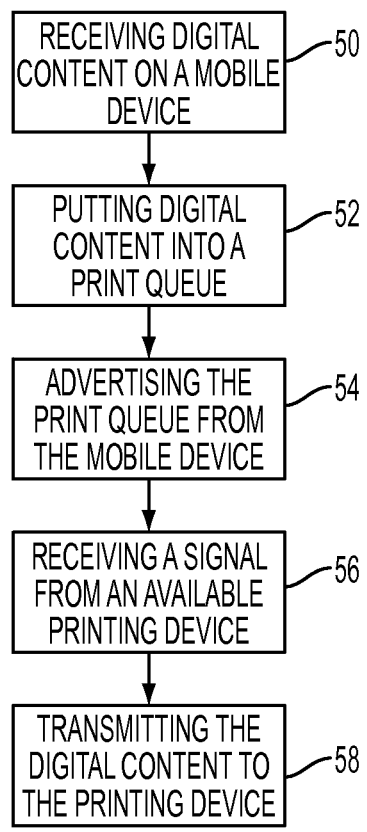
FIG. 3 shows a flowchart of an embodiment of a method of putting digital content into a print queue on a mobile device.

FIG. 3 shows an embodiment of a method of using a print server on a mobile device. At 50, the mobile device receives digital content. The digital content may come from an input device attached to the mobile device, such as a camera, etc., or may be received through a messaging service, such as email, SMS message, downloaded from a social network such as Facebook®, Instagram®, etc.

At 52, the device puts the digital content into a print queue managed by the print server application. The print server application does this in response to a user input that has identified the digital content for printing. The user input may also identify the characteristics of the printer to print the content. The characteristics may include the printer resolution, possibly in dots per inch (dpi), color profile, speed of printing, cost of printing, capacity of pages, types of paper available, location, etc. The digital content and the associated information are stored in the print queue.

In addition to the printers advertising their availability, the print server application will advertise itself as a print server at 54 using existing standards for advertising services such as mDNS, WSD or iBeacon. This allows the users' personal mobile device to be integrated into existing workflows as a means for capturing content which is meant to be printed. When a user's device comes in range of a printing device the print server application receives a signal from the printing device at 56.

The print server then notifies the user that a printing device is available and asks the user if the print queue should release the print content to the printing device. The content released may be only that content that has requirements that match the printing device capabilities, or, if the user chooses, the device may release all of the content in the queue if the user desires. The digital content is then released at 58 to the printing device.

The following discussion just sets out some examples of how the print server operates and is in no way intended to limit the scope of the embodiments or claims. In a first example, a user is at an outing with family and friends and uses the mobile device for pictures at a special event. The pictures reside on the consumer's mobile device in a digital format that can be easily transferred and shared with another mobile device immediately, but the user may not be near a photo quality printer of an appropriate resolution for printing the photos.

The internal print server enables the consumer to immediately add a photo to an internal print server. The internal print server then runs as a background application looking for photo printers that meet the print servers' specification. Once one is available, the user is notified to allow the user to decide what to do with the photos. Possible tasks may include printing the entire contents of the queue, printing just a portion of the selected jobs, delete jobs from the queue, ignore the request until a further date/time/location, remove the beaconing printer from the print server, and remove all printers from that geographical location.

When traveling for business, a traveler prepares documentation and reports that need to be printed at a meeting during the meet. The user is finishing these reports and documents while traveling and needs to have the documents to be printed for each meeting attendee upon arrival. The mobile device acts a beaconing printer that advertises various capabilities the traveler is able to print the documents to the personal print server with the selected printing characteristics. Upon the user's arrival at the destination when the user comes into range of a beaconing printer, the user is notified that their documents can now be printed and the application will guide the user to the printer location. Additionally, if the documents contain secure data the user will have the option to not start printing the documents until the user has indicated that the user has identified the printing device in which the documents will be printed.

In another example, a school teacher does research at home to prepare materials for the classroom. The teacher has added the school printer to the list of devices in the user's personal mobile print server while at school to allow the printer capabilities to be accurately reflected. Once the teacher has finished preparing the material on the teacher's laptop, the teacher can print the material to the print server. When the teacher arrives at school in the morning the material for that day will automatically begin printing and notify the teacher when the materials are ready for pick up.

In this manner, a mobile print server on a user's mobile device allows the user to identify and prepare digital content at the time it is received. When an appropriate printing device becomes available, the mobile device will send the content to the printer and allow it to be printed. The user avoids having to use the cloud, but also does not have to remember to print the content later.

It will be appreciated that variants of the above-disclosed and other features and functions, or alternatives thereof, may be combined into many other different systems or applications. Various presently unforeseen or unanticipated alternatives, modifications, variations, or improvements therein may be subsequently made by those skilled in the art which are also intended to be encompassed by the following claims.

What is claimed is:

1. A mobile device, comprising:
 a user interface;
 a processor;
 a storage;
 a network communication interface;
 a local communication interface;
 instructions stored in the storage that, when executed by the processor, allow the device to:
  receive and store digital content through one of the communication interfaces;
  identify the digital content for queueing for printing, based upon an input received through the user interface;
  queue the digital content for printing with associated desired characteristics of a printer to print the content;
  broadcast a request for a printer;
  notify the user that a printer having the desired characteristics is available and inquiring whether the content should be sent; and
  send the digital content to a printer that responds to the request and has the desired characteristics in response to the inquiring.

2. The mobile device of claim 1, further comprising one of a tablet or a cell phone.

3. The mobile device of claim 1, wherein the network communication interface comprises one of Ethernet and Wi-Fi.

4. The local communication interface of claim 1, comprises one of Bluetooth and infrared.

5. The mobile device of claim 1, wherein the desired characteristics include at least one of a printer resolution, printer location, speed of printing, and cost of printing.

6. A method, comprising:
 receiving digital content on a mobile computing device;
 receiving a user input from the user through a user interface on the mobile computing device indicating that the digital content should be stored in a print queue on the mobile computing device;
 storing the digital content in the print queue based upon the user input;
 transmitting a signal through a local communications interface on the mobile device, the signal advertising the print queue from the mobile device, wherein the signal includes desired characteristics of a printer to print the content;
 receiving a signal through the local communications interface from an available printing device that has the desired characteristics when the mobile device comes into range of the printing device;
 notifying the user that a printer having the desired characteristics is available and inquiring whether the content should be sent; and
 transmitting the digital content to the printing device in response to the inquiring.

7. The method of claim 6, further comprising notifying the user of the available printing device.

8. The method of claim 7, further comprising receiving an input from the user, the input indicating to print at least a portion of the print queue at the available printing device.

9. The method of claim 6, wherein transmitting a signal through a local communication interface comprises transmitting a Bluetooth signal.

10. The method of claim 6, wherein receiving digital content comprises receiving digital content through a network interface.

11. The method of claim 6, wherein receiving digital content comprises receiving at least one of an image, a map, a ticket, a boarding pass, and a document.

* * * * *